US010671810B2

(12) United States Patent
Koutrika et al.

(10) Patent No.: US 10,671,810 B2
(45) Date of Patent: Jun. 2, 2020

(54) CITATION EXPLANATIONS

(71) Applicant: Hewlett-Packard Development Company, L.P., Houston, TX (US)

(72) Inventors: Georgia Koutrika, Palo Alto, CA (US); Alkis Simitsis, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 280 days.

(21) Appl. No.: 15/518,759

(22) PCT Filed: Feb. 20, 2015

(86) PCT No.: PCT/US2015/016765
§ 371 (c)(1),
(2) Date: Apr. 12, 2017

(87) PCT Pub. No.: WO2016/133529
PCT Pub. Date: Aug. 25, 2016

(65) Prior Publication Data
US 2017/0308525 A1 Oct. 26, 2017

(51) Int. Cl.
*G06F 40/258* (2020.01)
*G06F 16/35* (2019.01)
(Continued)

(52) U.S. Cl.
CPC ............ *G06F 40/258* (2020.01); *G06F 16/35* (2019.01); *G06F 16/38* (2019.01); *G06F 40/289* (2020.01)

(58) Field of Classification Search
CPC .. G06F 17/2745; G06F 17/2775; G06F 16/35; G06F 16/38; G06F 17/30705; G06F 17/30722; G06F 17/30
See application file for complete search history.

(56) References Cited

U.S. PATENT DOCUMENTS 5,724,571 A * 3/1998 Woods .................... G06F 16/30
5,794,236 A    8/1998 Mehrle et al.
(Continued)

FOREIGN PATENT DOCUMENTS

CN    103210371         7/2013
KR    20170043365 A  *  4/2017  ............ G06F 17/27
WO    WO-01-42899 A1    6/2001

OTHER PUBLICATIONS

Besagni D. et al. "Citation recognition for scientific publications in digital libraries", Document Image Analysis for Libraries, 2884. Proceedings. First Int'l Workshop on Palo Alto, CA, USA 23-24 Jan. 2884, Los Alamitos, CA, USA IEEE Comput. Soc, US, 23 Jan. 2884 (2884-81-23), pp. 244-252, XP818681133, DOI: 18. 1189/ DIAL.2884. 1263253 ISBN: 978-8-7695-2888-9 * the whole document.

(Continued)

*Primary Examiner* — James E Richardson
(74) *Attorney, Agent, or Firm* — HP Inc. Patent Department

(57) ABSTRACT

Examples relate to citation explanations. A process to provide citation explanation is provided herein. The process analyzes a primary document to extract a citation claim. The process generates a set of candidate segments of a cited document that may correspond to the citation claim. The process also analyzes the set of candidate segments.

14 Claims, 10 Drawing Sheets

(51) Int. Cl.
*G06F 16/38* (2019.01)
*G06F 40/289* (2020.01)

(56) References Cited

U.S. PATENT DOCUMENTS

| | | | |
|---|---|---|---|
| 6,263,351 B1 | 7/2001 | Wolfe et al. | |
| 6,856,988 B1 * | 2/2005 | Humphrey | G06F 17/27 |
| | | | 707/749 |
| 7,376,634 B2 * | 5/2008 | Liu | G09B 7/00 |
| | | | 706/59 |
| 7,735,010 B2 * | 6/2010 | Zhang | G06F 16/382 |
| | | | 715/713 |
| 8,019,769 B2 | 9/2011 | Rolle et al. | |
| 8,527,863 B2 | 9/2013 | Duquene et al. | |
| 8,587,613 B2 | 11/2013 | Wang et al. | |
| 8,744,135 B2 | 6/2014 | Roman et al. | |
| 2005/0149523 A1 | 7/2005 | Humphrey et al. | |
| 2006/0224584 A1 * | 10/2006 | Price | G06F 16/313 |
| 2007/0239704 A1 | 10/2007 | Burns et al. | |
| 2007/0239706 A1 | 10/2007 | Zhang et al. | |
| 2009/0292673 A1 | 11/2009 | Carroll | |
| 2010/0131534 A1 * | 5/2010 | Takeda | G06F 17/21 |
| | | | 707/758 |
| 2011/0179035 A1 | 7/2011 | Zhang et al. | |
| 2011/0261030 A1 | 10/2011 | Bullock | |
| 2012/0054221 A1 | 3/2012 | Zhang et al. | |
| 2012/0233151 A1 | 9/2012 | Vanderwende et al. | |
| 2012/0233152 A1 * | 9/2012 | Vanderwende | G06F 16/382 |
| | | | 707/722 |
| 2012/0317468 A1 * | 12/2012 | Duquene | G06F 17/2235 |
| | | | 715/207 |
| 2013/0138692 A1 | 5/2013 | Zhang et al. | |
| 2014/0214825 A1 | 7/2014 | Zhang et al. | |
| 2014/0304579 A1 | 10/2014 | Foster et al. | |
| 2014/0365475 A1 * | 12/2014 | Bhandari | G06F 16/3334 |
| | | | 707/723 |
| 2017/0060857 A1 * | 3/2017 | Imbruce | G06T 13/40 |
| 2017/0132190 A1 * | 5/2017 | Koutrika | G06F 17/241 |
| 2017/0300471 A1 * | 10/2017 | Simske | G06F 40/263 |

OTHER PUBLICATIONS

"Citation Map".
Ritchie, A, "Citation Context Analysis for Information Retrieval", 2008.

* cited by examiner

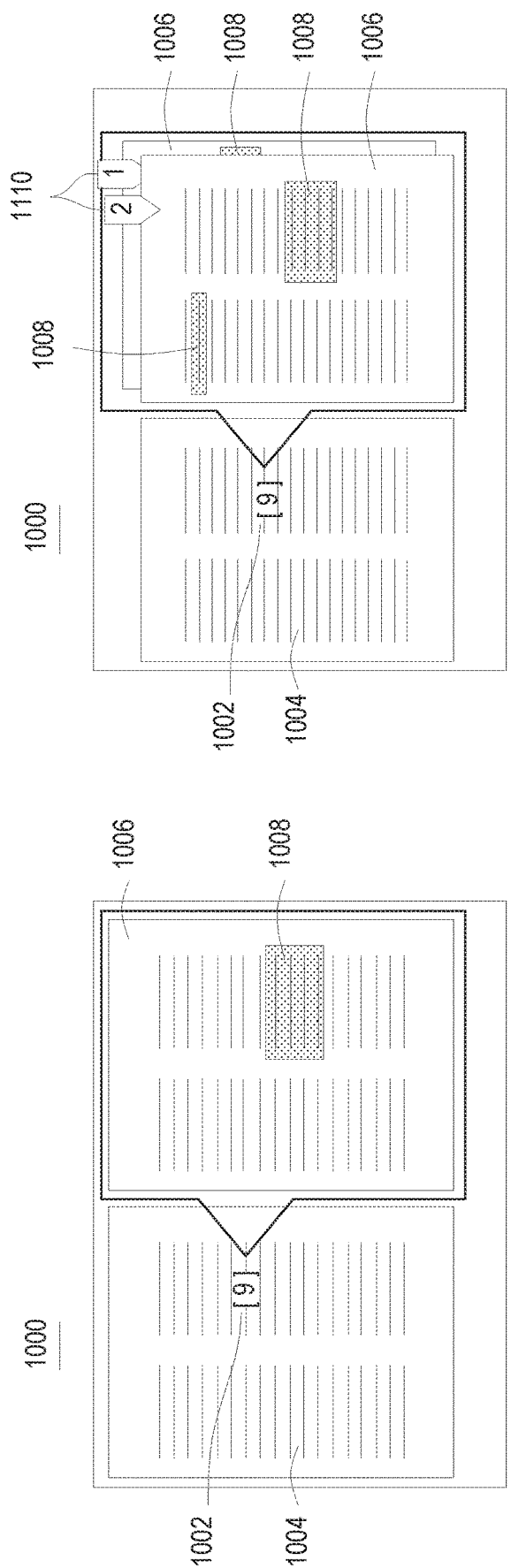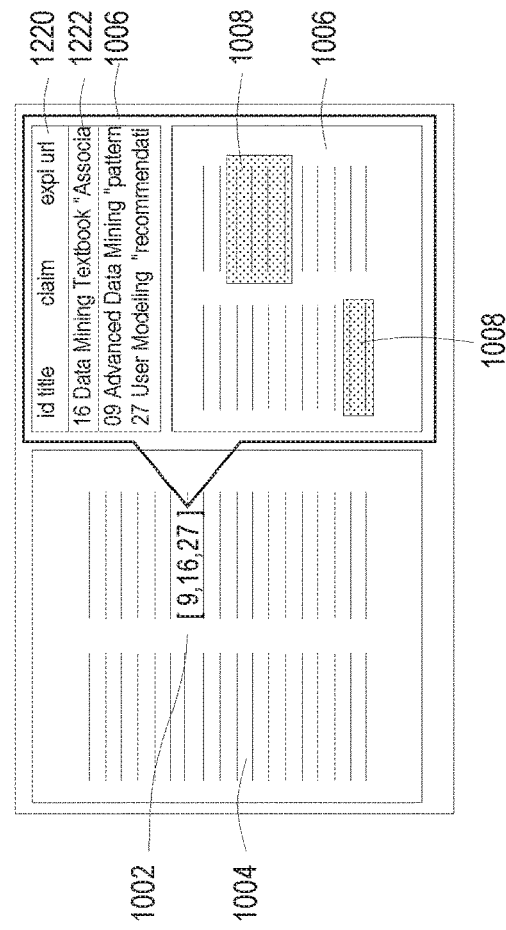

US 10,671,810 B2

CITATION EXPLANATIONS

BACKGROUND

Online education systems and e-books have started to dominate. A reader may check citations to review a definition or obtain a further explanation about a cited term. The reader may also want to determine whether the referenced material supports the author's argument in the claimed way or gauge the strength and validity of the material the author has used.

BRIEF DESCRIPTION OF THE DRAWINGS

The following detailed description references the drawings, wherein:

FIGS. 10-12 illustrate schematic diagrams of citation explanations according to examples.

DETAILED DESCRIPTION

Figure 1:
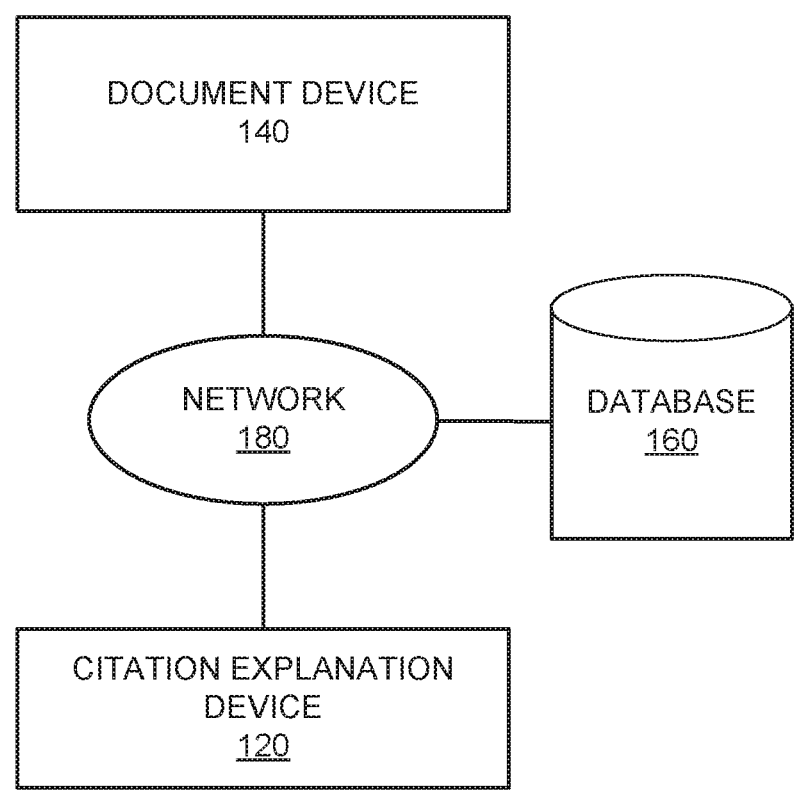
FIG. 1 illustrates a block diagram of a system for generating citation explanations according to an example.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

Online reading and learning are increasing in popularity and provide many advantages. For example, the online documents may include links to reference materials, such as cited documents, definitions, and explanations. Citations may include single citations and/or lists of citations. A first example includes a list of citation, "Association rules are different from our precedence patterns and they are useful for recommending items related to a particular item [9, 16, 27]." A second example includes a single citation, "query personalization [34]." The text accompanying the first and second examples are potentially a summary of a method or feature, a term, possibly defined in one or more citations, and/or a quote. However, reference material may also provide distractions and interruptions to the reader during the reading and learning process.

Examples relate to citation explanations that may provide reference material for a self-contained document. A process to provide citation explanations include analysis of a primary document to extract a citation claim. The process generates a set of candidate segments of a cited document that may correspond to the citation claim. The process also evaluates the set of candidate segments based on a predefined criteria. Recommendations for citation explanations may also be provided through the process.

As used herein, "primary document" refers to content, such as, text and/or images that a reader is viewing. The content may contain citations to support the text and other content presented by the author in the document. Use of citation explanations may reduce distractions and interruptions by making a self-contained document with the reference material provided therein.

As used herein, "citation" refers to a reference to a source embedded in the body of a document. Citations may appear in different forms. For example, a citation may be a list of citations or a single citation. The citation may be accompanied by text that may be a quote from the cited document, a paraphrase, a summary, and/or a definition, for example. Citations may appear in different styles, such as: "Geo et al., [3]", "[3]", [Geo 93], etc.

As used herein, "cited document" refers to a source being referenced. The source may be, for example, a text or image referenced in the citation. The source referred to may be a book, an article, a famous artistic work, a legal code, case law, etc. The source may originate as a physical copy of a document, such as a book or publication, or the source may originate as an electronic copy of a document, such as a blog or online article. Cited document as used herein refers to at least one source. At least one source is not limited to just one cited document, but also contemplates the use of a plurality of cited documents.

As used herein, "citation claim" refers to text that uses and/or provides context for a citation. In other words, it is this text that requires the use of the particular citation. For example, "Information Retrieval and Information Filtering have been called "two sides of the same coin" (e.g., [5])." In the example, a quote "two sides of the same coin" may be the text that provides context for the citation (e.g., "[5]").

As used herein, "candidate segment" refers to a portion of a cited document that may explain, define, support, and/or generally provide more details related to a citation claim.

As used herein, "revised candidate segment" refers to a candidate segment that is modified or adjusted. For example, the revised candidate segment may be two candidate segments merged together or one candidate segment divided into two candidate segments.

Referring now to the drawings, FIG. 1 illustrates a block diagram of a system for providing citation explanations according to an example. System 100 may be implemented in a number of different configurations without departing from the scope of the disclosed examples. In FIG. 1, system 100 may include a citation explanation device 120, a document device 140, a database 160, and a network 180 for connecting citation explanation device 120 with database 160 and/or document device 140.

Citation explanation device 120 may be a computing system that performs various functions consistent with disclosed examples, such as providing citation explanations for cited documents. For example, citation explanation device 120 may be a desktop computer, a laptop computer, a tablet computing device, a mobile phone, a server, and/or any other type of computing device. In some examples, citation explanation device 120 may extract a citation claim from a primary document using a syntactic analysis of a portion of the primary document. For example, the citation claim may include a quote from the cited document, a paraphrase, a summary, and/or a definition. Citation explanation device 120 may perform a pre-processing of the citation claim to provide a representation of the citation claim. The representation of the citation claims may be in the form of vector of words, a topic representation of the citation claims, the exact words or phrase of the citation, i.e., a quote. Citation explanation device 120 may classify citation claims and/or representations of citation claims based on an assignment of predefined classifications. For example, classifications may be determined categorizing citation claims by definition", "summary", "quote", "method" and/or "summary." The classification may be performed using different methods, such as decision trees, rules, or more complex methods. A model may be trained to take into account the syntactic, grammar and linguistic features of the claim.

Citation explanation device 120 may also identify a set of candidate segments of a cited document that may correspond to the citation claim. The term "may correspond" may refer to relevancy and/or relationships based on an analysis, i.e., the relevancy or relationship between candidate segments and citations claims. For example, the cited document and the citation claim may be compared to generate at least one candidate segment that matches or explains the citation claim. That portion of the cited document may be selected to represent at least one candidate segment. The set of candidate segments may each be ranked. The ranking may include assigning a value to each candidate segment based on at least one criteria, such as the number of key terms, location of terms, and/or location of segment in the cited document.

While identifying the set of candidate segments, citation explanation device 120 may adjust or modify the candidate segments to better align the segments with the citation claim. For example, at least two of the candidate segments may be merged to form a new or revised candidate segment. An updated rank to the revised candidate segment may be determined. Merging at least two of the candidate segments may be performed to provide candidate segments that better capture connections between primary documents and cited documents based on ranking criteria. Ranking criteria may refer to benchmarking characteristics of a cited document, such as key terms, frequency of key terms, structural data, classification data, and location of candidate segments in the cited document. According to another example, a candidate segment may also be split into two candidate segments. Candidate segments may be split if it is determined the segment is too large or contains extraneous information. The split may divide a candidate segment into at least two candidate segments with all the segments of the initial candidate segment. Alternatively, at least one portion of the initial candidate segment may be removed and at least two revised candidate segments may be created to focus on only the relevant segments and omit extraneous segments. Examples of citation explanation device 120 and certain functions that may be performed by citation explanation device 120 are described in greater detail below with respect to, for example, FIGS. 2-12.

Document device 140 may be any device that maintains, receives, or transfers data from a data collection. For example, document device 140 may be a scanning device or a computing device, such as a desktop computer, a laptop computer, a table computing device, a mobile phone, a server, or any other type of computing device. Document device 140 may receive, transfer, or otherwise access data collections, such as articles and controlled data sets, used to collect data for the citation explanation device 120. For example, document device 140 may provide access to documents. Document device 140 may also collect, maintain, query, and/or analyze digital versions of documents. Document device 140 may include a processor, and may access, via the processor, a digital version of the data collection, such as primary documents and/or cited documents. An example of a primary document, cited document, citation claim, and candidate segment are discussed in greater detail below with respect to, for example, FIGS. 4-5 and 8-9.

Database 160 may be any type of storage system configuration that facilitates the storage of data. For example, database 160 may facilitate the locating, accessing, and retrieving of data (e.g., SaaS, SQL, Access, etc. databases, XML files, etc.). Database 160 can be populated by a number of methods. For example, citation explanation device 120 may populate database 160 with database entries generated by citation explanation device 120, and store the database entries in database 160. As another example, citation explanation device 120 may populate database 160 by receiving a set of database entries from another component, a wireless network operator, and/or a user of document device 140, and storing the database entries in database 160. In yet another example, document device 140 may populate database 160 by, for example, transmitting data or obtaining data from documents, i.e., primary documents and cited documents.

The data may be obtained using electronic means, such as through use of a scanner or scanning device connected to the document device 140. The database entries can contain a plurality of fields, which may include information related to primary documents, citations, representations of citations, cited documents, indexing and structure data of cited documents, candidate segments, revised candidate segments, explainability ranking and scores, and segment recommendations. While in the example shown in FIG. 1 database 160 is a single component external to components 120 and 140, database 160 may comprise separate databases and/or may be part of devices 120, 140, and/or another device. In some implementations, database 160 may be managed by components of devices 120 and/or 140 that are capable of accessing, creating, controlling and/or otherwise managing data remotely through network 180.

Network 180 may be any type of network that facilitates communication between remote components, such as citation explanation device 120 and document device 140. For example, network 180 may be a local area network (LAN), a wide area network (WAN), a virtual private network, a dedicated intranet, the Internet, and/or a wireless network.

The arrangement illustrated in FIG. 1 is simply an example, and system 100 may be implemented in a number of different configurations. For example, while FIG. 1, shows one citation explanation device 120, document device 140, database 160, and network 180, system 100 may include any number of components 120, 140, 160, and 180, as well as other components not depicted in FIG. 1. System 100 may also omit any of components 120, 140, 160, and 180. For example, citation explanation device 120 and document device 140 may be directly connected instead of being connected via network 180. As another example, citation explanation device 120 and document device 140 may combined to be a single device.

Figure 2:
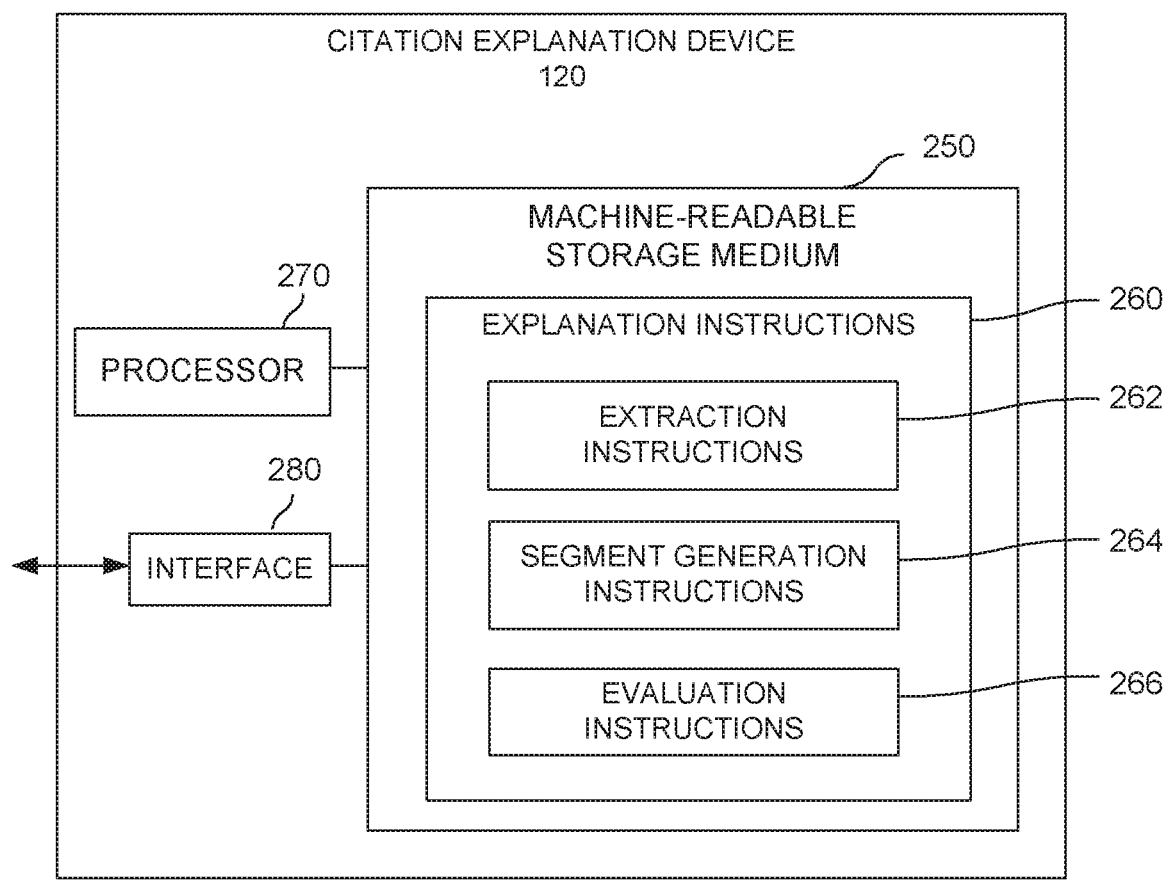
FIGS. 2-3 illustrate block diagrams of citation explanation devices according to examples.
Figure 3:
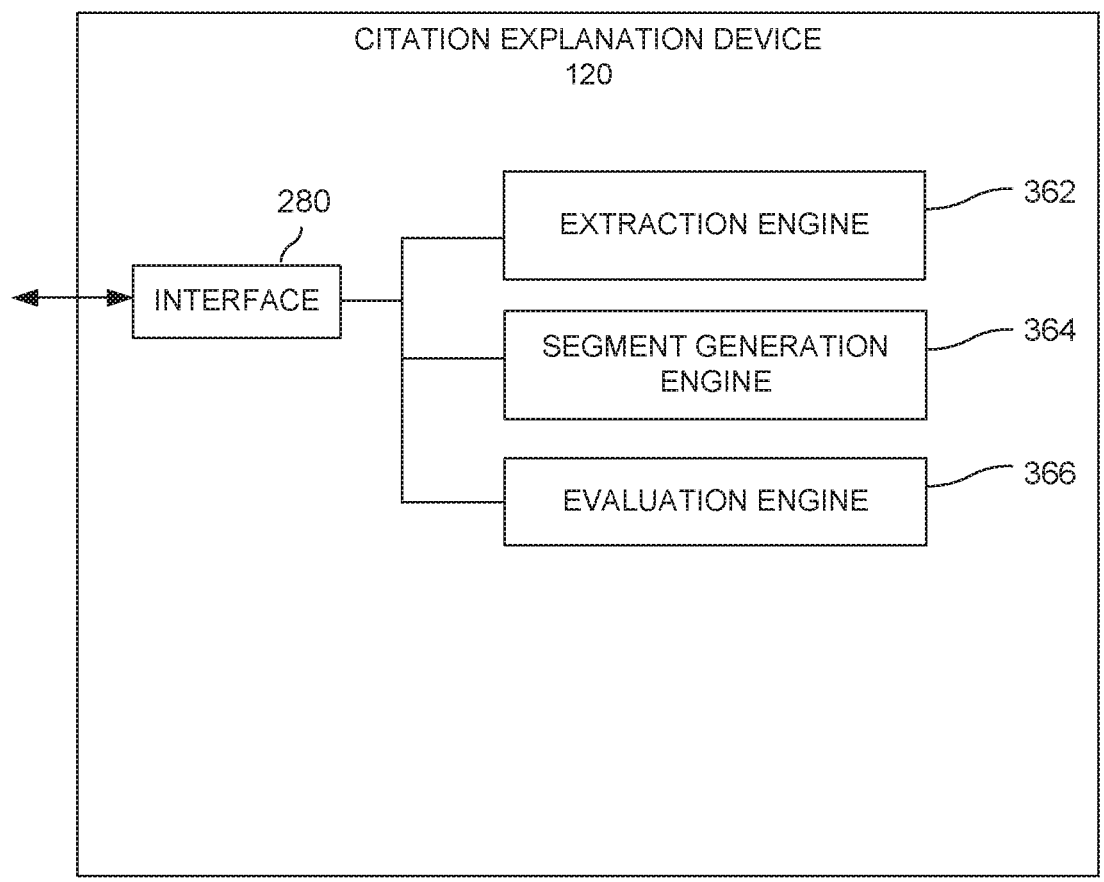

FIGS. 2-3 illustrate block diagrams of citation explanation devices according to examples. Referring to FIG. 2, a citation explanation device 120 is illustrated. In certain aspects, citation explanation device 120 may correspond to multiple citation explanation device 120 of FIG. 1. Citation explanation device 120 may be implemented in various ways. For example, citation explanation device 120 may be a special purpose computer, a server, a mainframe computer, a computing device executing instructions that receive and process information and provide responses, and/or any other type of computing device. In the example shown in FIG. 2, citation explanation device 120 may include a machine-readable storage medium 250, a processor 270, and an interface 280.

Processor 270 may be at least one processing unit (CPU), microprocessor, and/or another hardware device to execute instructions to perform operations. For example, processor 270 may fetch, decode, and execute explanation instructions 260 (e.g., instructions 262, 264, and/or 266) stored in machine-readable storage medium 250 to perform operations related to examples provided herein.

Interface 280 may be any device that facilitates the transfer of information between citation explanation device 120 and other components, such as document device 140 and/or database 160. In some examples, interface 280 may include a network interface device that allows device to receive and send data to and from network 180. For example, interface 280 may retrieve and process data related to providing citation explanations from database 160 via network 180.

Machine-readable storage medium 250 may be any electronic, magnetic, optical, or other physical storage device that stores executable instructions. Thus, machine-readable storage medium 250 may be, for example, memory, a storage drive, an optical disc, and/or the like. In some implementations, machine-readable storage medium 250 may be non-transitory, such as a non-transitory computer-readable storage medium, where the term "non-transitory" does not encompass transitory propagating signals. Machine-readable storage medium 250 may be encoded with instructions that, when executed by processor 270, perform operations consistent with the examples herein. For example, machine-readable storage medium 250 may include instructions that perform operations that provide citation explanations by extracting citation claims from a primary document, generate segment candidates from a cited document, and evaluate the segment candidates. In the example shown in FIG. 2, machine-readable storage medium 250 may include extraction instructions 262, segment generation instructions 264, and evaluation instructions 266.

Extraction instructions 262 may function to extract and classify a citation claim from a primary document using a syntactic analysis of a portion of the primary document. For example, when extraction instructions 262 are executed by processor 270, extraction instructions 262 may cause processor 270 of citation explanation device 120, and/or another processor to extract a citation and perform a pre-processing of the citation to provide a representation of the citation as a citation claim. The citation claim may include at least one structure selected from a vector of words, a topic representation, and a set of exact words. The execution of the extraction instructions 262 may also cause processor 270 of citation explanation device 120, and/or another processor to classify the citation claim based on assignment of pre-defined classes. Examples of the steps involved in the extraction are described in further detail below with respect to, for example, FIGS. 4-5.

Segment generation instructions 264 may function to generate a set of candidate segments of a cited document that may correspond to the citation claim. For example, when segment generation instructions 264 are executed by processor 270, segment generation instructions 264 may cause processor 270 of citation explanation device 120, and/or another processor to identify a set of candidate segments of a cited document that may correspond to the citation claim. Examples of the steps involved in generating a set of candidate segments profiles are described in further detail below with respect to, for example, FIGS. 4-7.

Evaluation instructions 266 may function to analyze the set of candidate segments in order to rank each candidate segment of the set of candidate segments. For example, when evaluation instructions 266 are executed by processor 270, evaluation instructions 266 may cause processor 270 of citation explanation device 120, and/or another processor to analyze the set of candidate segments. The analysis may include ranking each candidate segment of the set of candidate segments. Various methods for ranking may be used. For example at least one candidate segment of the set of candidate segments is selected for display based on an explainability score. The explainability score may be determined by evaluating at least one factor selected from key terms, frequency of key terms, structural data, classification data, and location of candidate segments in the cited document. Evaluation instructions 266 may further function to merge at least two of the candidate segments to form a revised candidate segment and provides an updated rank to the revised candidate segment. Examples of the steps involved in analyzing the set of candidate segments are described in further detail below with respect to, for example, FIGS. 4-5 and 8-9.

Referring to FIG. 3, citation explanation device 120 is illustrated to include an extraction engine 362, a segment generation engine 364, and an evaluation engine 366. In certain aspects, citation explanation device 120 may correspond to citation explanation device 120 of FIGS. 1-2. Citation explanation device 120 may be implemented in various ways. For example, citation explanation device 120 may be a computing system and/or any other suitable component or collection of components that provide citation explanations.

Interface 280 may be any device that facilitates the transfer of information between citation explanation device 120 and external components. In some examples, interface 280 may include a network interface device that allows citation explanation device 120 to receive and send data to and from a network. For example, interface 280 may retrieve and process data related to providing citation explanations using data from citation explanation device 120, document device 140, and/or database 160.

Engines 362, 364, and 366 may be electronic circuitry for implementing functionality consistent with disclosed examples. For example, engines 362, 364, and 366 may represent combinations of hardware devices and instructions to implement functionality consistent with disclosed implementations. For example, the instructions for the engines may be processor-executable instructions stored on a non-transitory machine-readable storage medium and the hardware for the engines may include a processor to execute those instructions. In some examples, the functionality of engines 362, 364, and 366 may correspond to operations performed by citation explanation device 120 of FIGS. 1-2, such as operations performed when explanation instructions 260 are executed by processor 270.

In FIG. 3, extraction engine 362 may represent a combination of hardware and instructions that performs operations similar to those performed when processor 270 executes extraction instructions 262. Similarly, segment generation engine 364 may represent a combination of hardware and instructions that performs operations similar to those performed when processor 270 executes segment generation instructions 264, and evaluation engine 366 may represent a combination of hardware and instructions that performs operations similar to those performed when processor 270 executes evaluation instructions 266.

Figure 4:
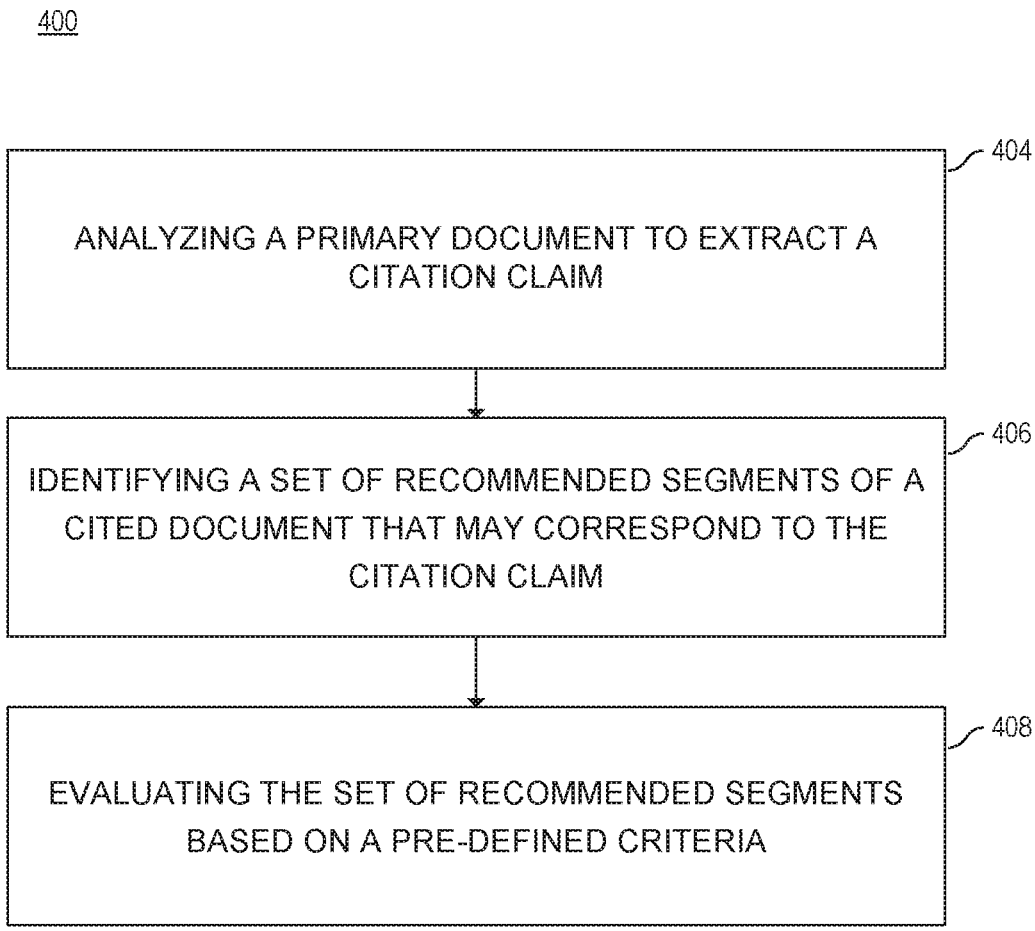
FIGS. 4-5 illustrate flow charts of a process for providing citation explanations according to examples.
Figure 5:
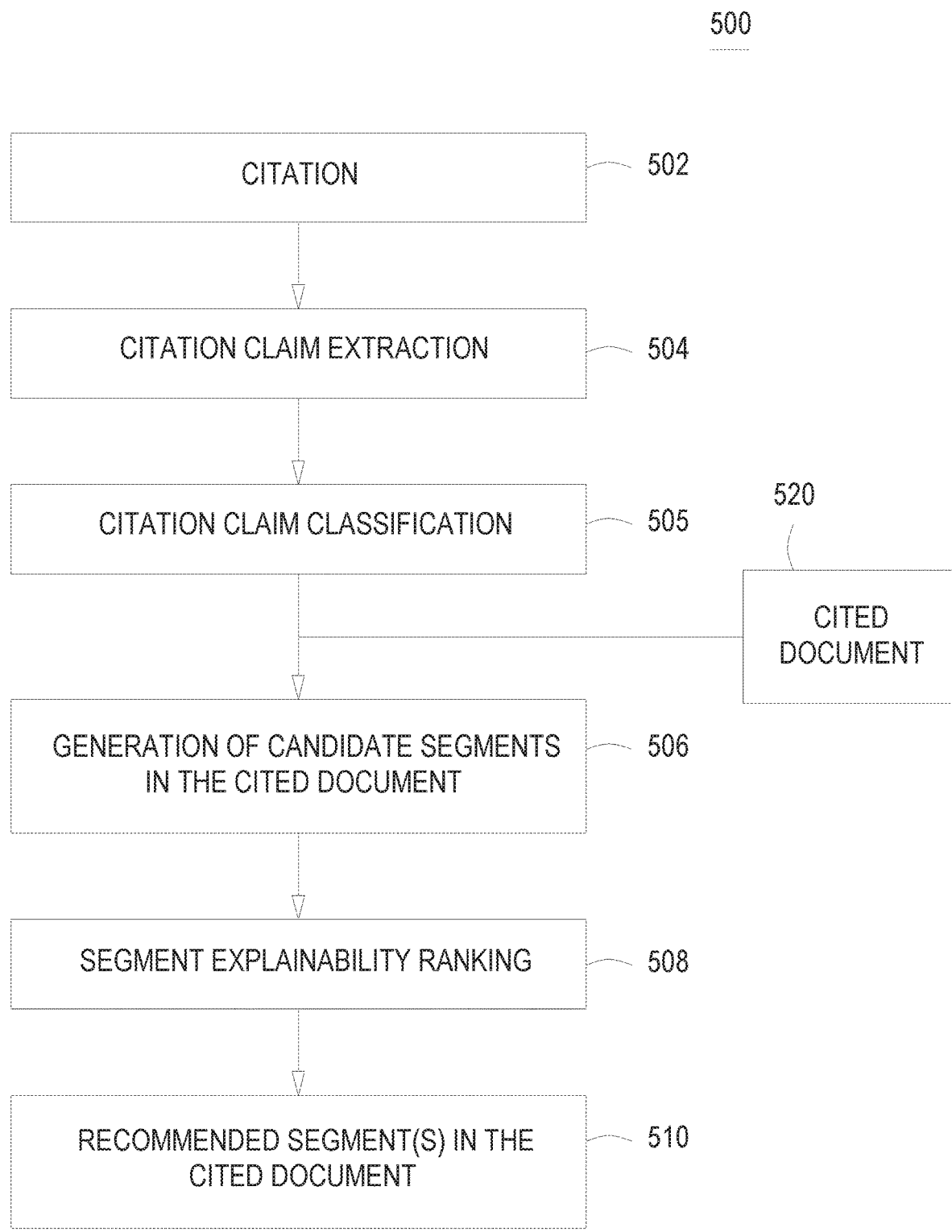

FIGS. 4-5 illustrate flow charts of a process for providing citation explanations according to examples. Although execution of processes 400 and 500 are described below with reference to system 100, other suitable systems and/or devices for execution of at least one step of processes 400 and 500 may be used. For example, processes described below as being performed by system 100 may be performed by citation explanation device 120, document device 140, and/or any other suitable device or system. Processes 400 and 500 may be implemented in the form of executable instructions stored on a storage device, such as a machine-readable storage medium, and/or in the form of electronic circuitry.

Referring to FIG. 4, a method to provide citation explanations is provided. Process 400 may start by analyzing a primary document to extract a citation claim (step 404). The analysis of the primary document may be performed using a variety of analysis methods. For example, syntactic analysis may identify sentence boundaries, and the sentence that contains the citation may be considered as the citation claim. A different example is a fixed-window context analysis (i.e., a window size of 100 words) around the citation itself. Yet another method is to analyze not only the sentence that contains the citation but also a number (e.g., 1-2) of sentences following that in order to see if these sentences refer to the same citation. For example, citation "Information Retrieval and Information Filtering have been called "two sides of the same coin" (e.g., [5]). This paper explained the differences . . . " and surrounding text may be analyzed using one of the above methods, i.e., syntactic, fixed-window context, sentences surrounding the citation. For example, citation explanation device 120 and/or document device 140 of system 100 may query or otherwise access database 160 to determine appropriate analysis method stored in a storage device, such as database 160.

Process 400 may also include identifying a set of candidate segments of a cited document that may correspond to the citation claim (step 406). For example, citation explanation device 120 and/or document device 140 may compare the cited document and the citation claim to generate at least one candidate segment that matches or explains the citation claim. That portion of the cited document may be selected to represent at least one candidate segment. The set of candidate segments may be stored in a storage device, such as database 160, and citation explanation device 120 and/or document device 140 may query database 160 to obtain candidate segments. In a further example, citation explanation device 120 and/document device 140 may also analyze the cited document to provide a structure for the cited document or generate an index of the cited document. The data related to the structure and/or index may be stored in a storage device, such as database 160, and citation explanation device 120 and/or document device 140 may query database 160 to obtain structure and/or index data.

Process 400 may also include evaluating the set of candidate segments based on a pre-defined criteria (step 408). For example, citation explanation device 120 and/or document device 140 may assign an explainability score to each candidate segment. Explainability scores of each candidate segment may be determined using at least one factor selected from key terms, frequency of key terms, structural data, classification data, and location of candidate segments in the cited document. Explainability scores may be stored in a storage device, such as database 160, and citation explanation device 120 and/or document device 140 may query database 160 to obtain explainability scores.

In a further example, citation explanation device 120 and/or document device 140 may merge at least two segments of the set of candidate segments to form a revised candidate segment. Citation explanation device 120 and/or document device 140 may then providing an explainability score of the revised candidate segment. Revised candidate segments and explainability scores may be stored in a storage device, such as database 160, and citation explanation device 120 and/or document device 140 may query database 160 to obtain revised candidate segments and explainability scores. After evaluation of the candidate segments has been completed, process 400 may end.

Referring to FIG. 5, process 500 starts with a citation (step 502). Process 500 may include analyzing a primary document to extract a citation claim (step 504). For example, citation explanation device 120 and/or document device 140 may analyze the primary document to identify and extract a citation claim. Citation claims may be stored in a storage device, such as database 160, and citation explanation device 120 and/or document device 140 may query database 160 to obtain citation claims.

Process 500 may also include classifying the citation claim (step 505) extracted in step 502. For example, citation explanation device 120 and/or document device 140 may evaluate the citation claim extracted and classify the claim based on a set of pre-defined classes, such as "definition," "summary," "quote," "method," and/or "conclusion." The classification may be performed using different methods, such as decision trees, rules, or more complex methods. Classification models may be trained to take into account the syntactic, grammar and linguistic features of the claim. Knowing a possible class of a citation claim may be used as an additional source of information by the method to identify and evaluate candidate segments that match the citation claim. For example, knowing the citation claim is a quote, enables searching for exact matches of the citation claim in the cited document. The classes may be stored in a storage device, such as database 160, and citation explanation device 120 and/or document device 140 may query database 160 to obtain classes and citation claims associated therewith.

Process 500 may also include generating a set of candidate segments of a cited document that may correspond to the citation claim (step 506). Prior to generation of candidate segments, a cited document may be obtained (step 520). For example, citation explanation device 120 and/or document device 140 may obtain the cited document. Citation explanation device 120 and/or document device 140 may then compare the cited document and the citation claim to generate at least one candidate segment that matches or explains the citation claim. Candidate segments may be stored in a storage device, such as database 160, and citation explanation device 120 and/or document device 140 may query database 160 to obtain candidate segments.

Process 500 may also retrieve or obtain a cited document (step 520). For example, citation explanation device 120 and/or document device 140 may fetch cited documents cited by the citation. The description of the cited document provided in the bibliographic references section of the work may be used to search the web or query a database, such as a bibliography database, in order to retrieve or obtain the cited document. Alternatively, the reader may provide the location of the document or the document itself to the system. Cited documents may be stored in a storage device, such as database 160, and citation explanation device 120 and/or document device 140 may query database 160 to obtain cited documents.

Process 500 may also include evaluating the set of candidate segments based on a pre-defined criteria (step 508). Pre-defined criteria may include factors that are used to determine a ranking or score. Examples of factors may include number of key terms, location of terms, and/or location of segment in the cited document. For example, citation explanation device 120 and/or document device 140 may assign an explainability ranking or explainability score to each candidate segment. Explainability rankings may be stored in a storage device, such as database 160, and citation explanation device 120 and/or document device 140 may query database 160 to obtain explainability rankings and/or candidate segments associated therewith. After candidate segments are evaluated, process 500 may recommend segments of the cited document to be imbedded into the primary document for reference by a reader (step 510).

Figure 6:
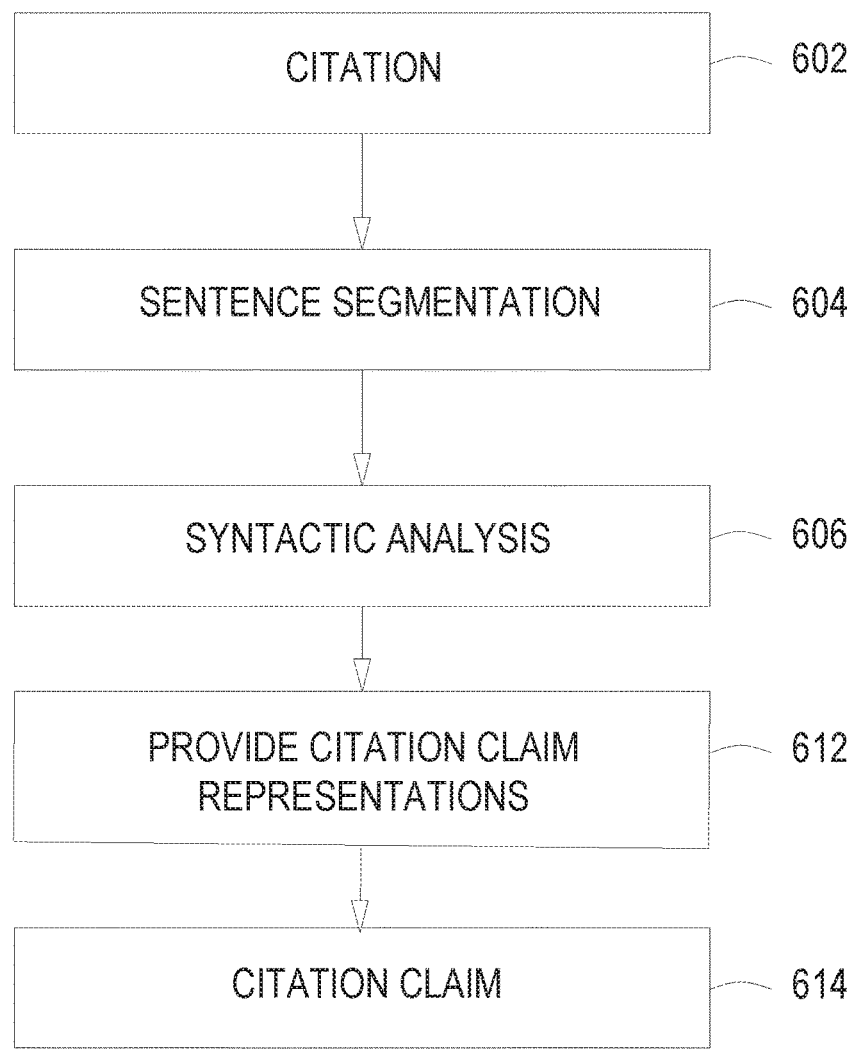
FIGS. 6-7 illustrate flow charts of a process for extracting citation claims according to examples.
Figure 7:
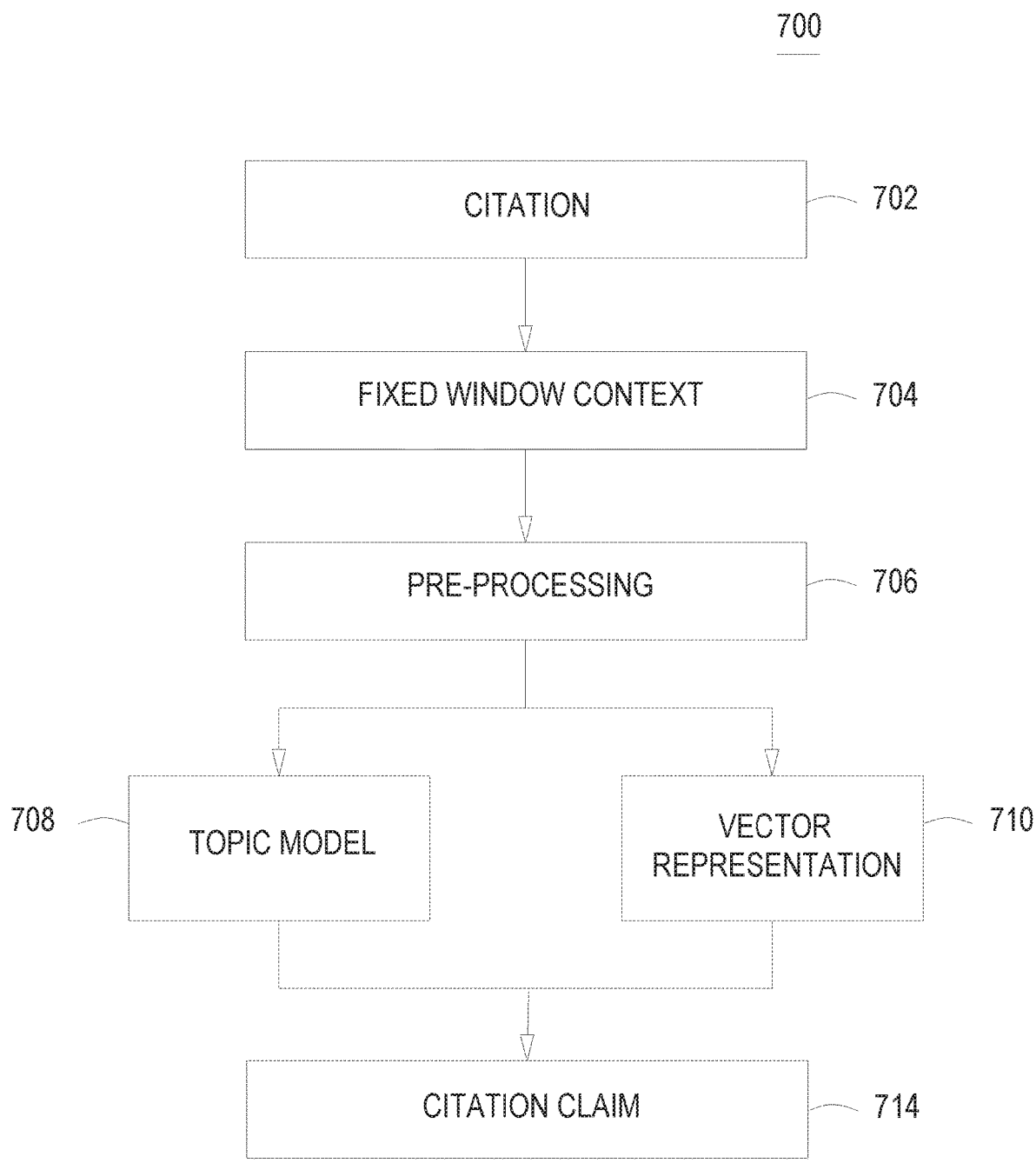

FIGS. 6-7 illustrate flow charts of a process for extracting citation claims according to examples. FIGS. 6-7 are sub-process of FIGS. 4-5. Although execution of processes 600 and 700 are described below with reference to system 100, other suitable systems and/or devices for execution of at least one step of processes 600 and 700 may be used. For example, processes described below as being performed by system 100 may be performed by citation explanation device 120, document device 140, and/or any other suitable device or system. Processes 600 and 700 may be implemented in the form of executable instructions stored on a storage device, such as a machine-readable storage medium, and/or in the form of electronic circuitry.

Referring to FIG. 6, process 600 starts with a citation (step 602). Process 600 may include sentence segmentation (step 604). For example, citation explanation device 120 and/or document device 140 may identify sentence boundaries to extract the citation claim c for a citation. The sentence boundaries extracted may be used in analysis of the citation. The sentence segmentation data may be stored in a storage device, such as database 160, and citation explanation device 120 and/or document device 140 may query database 160 to obtain sentence segmentation data Process 600 may also include syntactic analysis of a citation (step 606). For example, citation explanation device 120 and/or document device 140 may identify the sentence that contains the citation to be considered as the citation claim. The sentence may be stored in a storage device, such as database 160, and citation explanation device 120 and/or document device 140 may query database 160 for the sentence.

After the sentence is identified by syntactic analysis (step 606), process 600 may generate a more concise representation, such as an exact representation or a vector representation of the sentence. For example, citation explanation device 120 and/or document device 140 may capture exact text of the sentence in the exact order, i.e., as a quote. The exact text may be used to perform an exact match search of the text within the cited document, such as for steps 406 and 506 of FIGS. 4 and 5 respectively. An exact-match search may be useful in the case of quotes.

In another example, citation explanation device 120 and/or document device 140 may generate a vector of words from the sentence. The vector of words may be used to perform an approximate match search of the text within the cited document, such as for steps 406 and 506 of FIGS. 4 and 5 respectively. The approximate match search may use a vector of terms to find an approximate match of the terms.

Process 600 may also include providing citation claim representations (step 612). For example, citation explanation device 120 and/or document device 140 may provide a citation claim representation, such as exact and/or vector representations generated. The claim citation representations may be stored in a storage device, such as database 160, and citation explanation device 120 and/or document device 140 may query database 160 to obtain the citation claim representations. Process 600 outputs the citation claim representation as a citation claim (step 614) to citation explanation device 120 and/or document device 140.

Referring to FIG. 7, process 700 starts with a citation (step 702). Instead of syntactic analysis (step 606 of FIG. 6), process 700 provides an example of a process to analyze a citation using a fixed window context (step 704) to extract a citation claim. For example, citation explanation device 120 and/or document device 140 may consider a fixed-window context, i.e., a size of words, such as 100, around the citation itself. The words in the fixed window context may be stored in a storage device, such as database 160, and citation explanation device 120 and/or document device 140 may query database 160 to obtain the words in the fixed window context.

After the fixed window is identified, process 700 may also include pre-processing (step 706). For example, citation explanation device 120 and/or document device 140 may apply a pre-processing to the fixed window to remove stop words and other noise words. By pre-processing a more concise representation may be generated. The pre-processing results may be stored in a storage device, such as database 160, and citation explanation device 120 and/or document device 140 may query database 160 to obtain the pre-processing results.

The pre-processing (step 706) may provide a topic model (step 708) to represent the citation claim. For example, citation explanation device 120 and/or document device 140 may generate a topic representation of the fixed window. A topic model may be used to perform approximate match search of the text within the cited document, such as for steps 406 and 506 of FIGS. 4 and 5 respectively. A topic model may also be used to perform a topic match search on the cited document to find a topic match.

In another example, process 700 may provide a vector representation (step 710) of the fixed window. For example, citation explanation device 120 and/or document device 140 may generate a vector of words from the fixed window. The vector of words may be used to perform approximate match search of the text within the cited document, such as for steps 406 and 506 of FIGS. 4 and 5 respectively. The approximate match search may use a vector of terms from the fixed window. The topic model and/or vector representation may be stored in a storage device, such as database 160, and citation explanation device 120 and/or document device 140 may query database 160 to obtain a topic model and/or vector representation. Process 700 outputs a topic model and/or vector representation generated in steps 708-710 as a citation claim (step 714) to citation explanation device 120 and/or document device 140.

Figure 8:
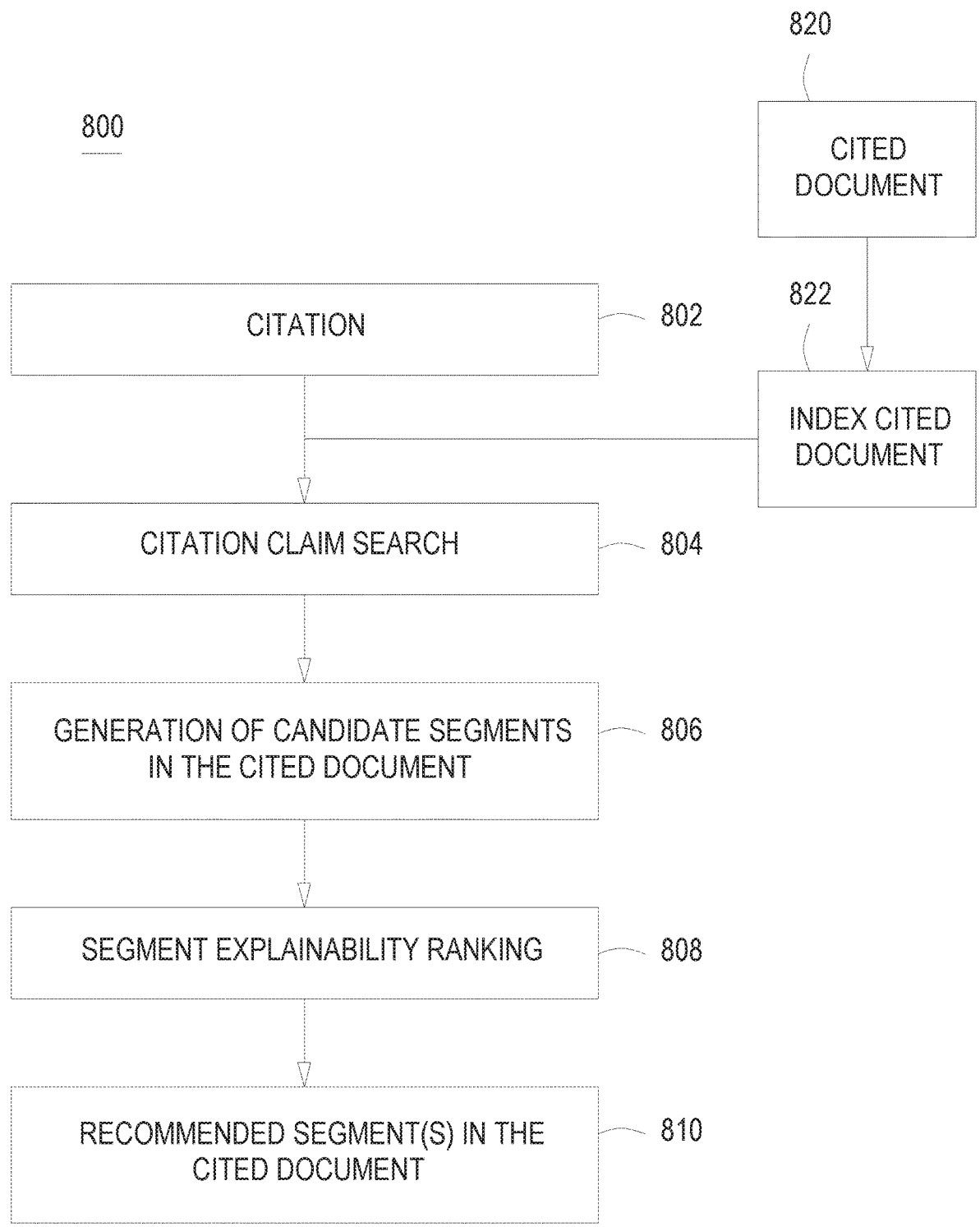
FIGS. 8-9 illustrate flow charts of a process for providing candidate segments of a cited document according to examples.
Figure 9:
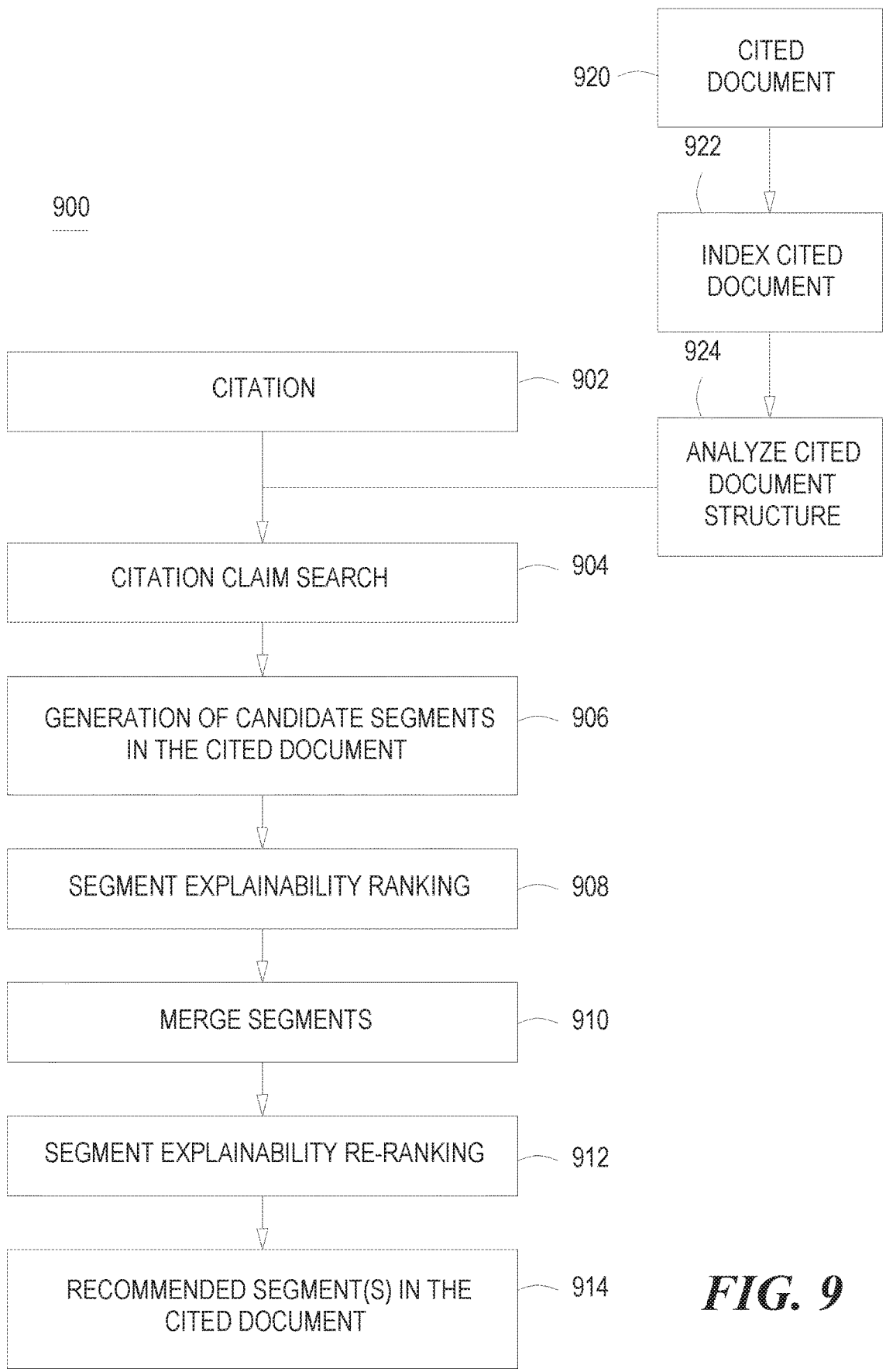

FIGS. 8-9 illustrate flow charts of a process for providing candidate segments of a cited document according to examples. FIGS. 8-9 are sub-process of FIGS. 4-5. Although execution of processes 800 and 900 are described below with reference to system 100, other suitable systems and/or devices for execution of at least one step of processes 800 and 900 may be used. For example, processes described below as being performed by system 100 may be performed by citation explanation device 120, document device 140, and/or any other suitable device or system. Processes 800 and 900 may be implemented in the form of executable instructions stored on a storage device, such as a machine-readable storage medium, and/or in the form of electronic circuitry Referring to FIG. 8, process 800 starts with a citation (step 802). Process 800 may include a citation claim search (step 804). For example, citation explanation device 120 and/or document device 140 may compare a citation claim to an index in a cited document in order to find possible locations that would explain the citation claim. An optimization may be performed to prune the candidates. One method to prune results may include determining whether the citation claim is simply referenced, such as a term, without much additional information in the surrounding text to explain the citation claim. Determining whether a citation claim is a term may be computed as a pre-processing step, such as step 706 of FIG. 7. In the term example, a ranking could be assigned and stored for each tuple: <claim, doc, loc, expl-ranking>, where expl-ranking accounts for the "explainability" of the claim in the given "location" (loc) and cited document (doc).

In a further example, citation explanation device 120 and/or document device 140 may receive a citation claim that provides more details about the location of a citation or cited claim in the cited document referred thereto, such as "Blei et al., page 21". In the instance where the location of the citation or cited claim is provided, the citation may be analyzed to obtain the specific details, for example, page, paragraph, or line. Specific details of the citation may aid in the task of searching for a citation claim in the cited document either for limiting the search within the specified location or to rank higher segments coming from this location without excluding other segments that may also support the claim, such as portions that provide better and/or worse support for the citation claim. The citation claim search may be stored in a storage device, such as database 160, and citation explanation device 120 and/or document device 140 may query database 160 to obtain the citation claim search information and/or results.

Process 800 may also include generation of candidate segments in the cited document (step 806). For example, citation explanation device 120 and/or document device 140 may generate candidate segments in the cited document that may explain, define, support, and/or generally provide more details on the claim. Several methods may be used to generate candidate segments that may match and explain the citation claim. One method is to select sentences that match the citation claim. Alternatively, a window-based method selects windows of text that contain terms of the citation claim. Usually the windows contain one or several of the claim terms and may span sentences.

Segment generation can be also performed in conjunction with the segment explanation ranking or scoring to provide candidate segments identified have sufficiently high rankings or scores. For example, if the citation claim is found as a phrase, occurrences of the phrase in the cited document will be given priority. If not, windows within the cited document that contain multiple query terms will be selected. Scoring models may combine positional factors, for example, favoring the first paragraphs of document and the first and last sentences of paragraphs, with content factors. Scoring models with positional factor may emphasize sentences with key terms, which have low document frequency in a data collection as a whole, but high frequency and good distribution across the particular cited document.

Additionally, if the structure information of the cited document and the class information of the citation claim are available, structure information may be used to generate candidate segments that respect the structure of the cited document and the class of the citation claim. For example if the citation claim is a "definition," then the segment generation may look only into the definitions of the cited document. For example, several steps may be involved in using structure information illustrated as steps that are analyzed during the citation claim search (step 804) and/or the index of cited document (step 822). The steps and/or data associated with the generation of candidate segments may be stored in a storage device, such as database 160, and citation explanation device 120 and/or document device 140 may query database 160 to obtain the steps and/or data associated with the generation of candidate segments.

Process 800 may also include segment explainability ranking (step 808). For example, citation explanation device 120 and/or document device 140 may compute an explainability ranking or score that captures a likelihood of a specific segment being a good explanation of the citation. The ranking or score is computed by taking into account several factors, including: 1) content factors, emphasizing sentences with key terms, which have low document frequency in the collection as a whole, but high frequency and good distribution across the particular document being returned; 2) structural and class information, favoring parts of the document that match the class of the claim; 3) positional or location factors, e.g., favoring the first and last paragraphs of documents and the first and last sentences of paragraphs; and 4) the information value of a segment, which captures how much information the segment reveals and/or contains with respect to the citation claim. For example, does this segment "define" the citation claim or just use it? Does this segment provide more information about the citation claim compared to what already known by the citation claim itself?

An example of a formula to compute the explainability rank or score of a segment s for a citation claim c is as follows: $explainability(s,c) = m*(1/pos(s))*sim(c,s) + n*class\_sim(c,s) + k*inf(s)$, $m+n+k=1$, where $pos(s)$ is the position of the segment, $sim(c,s)$ is the content similarity between c and s (e.g., computed using the cosine or Jaccard index), $class\_sim(c,s)$ is, for example, 1 if c and s belong to the same structural class and 0 otherwise, $inf(s)$ is the information value of s defined as $|length(s)-length(c)|/length(c)$. Other metrics for information value can take into account information gain and/or entropy. Finally, m, n, k are tuning parameters in the formula. The segment explainability ranking may be stored in a storage device, such as database 160, and citation explanation device 120 and/or document device 140 may query database 160 to obtain the segment explainability ranking.

After segment explainability rankings have been completed, process 800 may recommend segment(s) in the cited document (step 810). For example, citation explanation device 120 and/or document device 140 may provide the best candidate segments that explain the citation or the top candidate segment. The recommended segment(s) may be stored in a storage device, such as database 160, and citation explanation device 120 and/or document device 140 may query database 160 to obtain recommended segment(s). Recommended segments of the cited document may be imbedded into the primary document for reference by a reader.

Process 800 may also include obtaining a cited document (step 820). For example, citation explanation device 120 and/or document device 140 may obtain the cited document using a query of an external or internal source. The cited document may be stored in a storage device, such as database 160, and citation explanation device 120 and/or document device 140 may query database 160 to obtain the cited document.

Process 800 may also include indexing a cited document (step 822). For example, citation explanation device 120 and/or document device 140 may analyze the cited document to generate an index that will be used for matching the claim against the document. The index keeps information about the words found in the document, occurrence statistics, and word positions in the document. The index may enable early pruning, such as determinations to ignore parts of the document with low explainability value, like references, abstract, title, and/or figure captions. The index data may be stored in a storage device, such as database 160, and citation explanation device 120 and/or document device 140 may query database 160 to obtain index data. Index data may be obtained prior to the citation claim search step 804 and used in the citation claim search to improve results. Referring to FIG. 9, process 900 starts with a citation (step 902). Process 900 may include citation claim search (step 904) similar to that discussed above in FIG. 8 (step 804) and generation of candidate segments in the cited document (step 906) similar to that discussed above in FIG. 8 (step 806). Process 900 may include generation of candidate segments in the cited document (step 906) similar to that discuss in FIG. 8 (step 806). Process 900 may also include segment explainability ranking (step 908) similar to segment explainability ranking in FIG. 8 (step 808); however, FIG. 9 may refine the segment explainability rankings of step 908.

Process 900 may merge segments (step 910). For example, citation explanation device 120 and/or document device 140 may iteratively combine segments into bigger segments that have higher explainability score. For example, merger may be necessary when generated segments partially cover the citation claim and a combination of candidate segments proposed may be required to explain the citation claim. In a further example, details related to a list of citations may be desired. In this instance, the steps of citation claim search (step 904), generation of candidate segments in the cited document (step 906), may need to be performed for all cited documents. After performing the steps, the candidate segments from the cited documents may be combined into a single response, revised candidate segment.

Process 900 may also include segment explainability re-ranking (step 912), which repeats the process of segment explainability ranking (step 908) on the revised candidate segment. Merging segments and re-ranking the segments is useful when more than one segment from one or more cited document is required to generate a good explanation. The resulting merge segments and segment explainability re-ranking data may be stored in a storage device, such as database 160, and citation explanation device 120 and/or document device 140 may query database 160 to obtain merge segments and segment explainability re-ranking data. After segment explainability re-rankings have been completed, process 900 may recommend segment(s) in the cited document (step 914). Recommended segments of the cited document may be imbedded into the primary document for reference by a reader.

Process 900 may also include obtaining a cited document (step 920). For example, citation explanation device 120 and/or document device 140 may obtain the cited document using a query of an external and/or internal source. The cited document may be stored in a storage device, such as database 160, and citation explanation device 120 and/or document device 140 may query database 160 to obtain the cited document.

Process 900 may also include indexing a cited document (step 922) similar to the indexing of a document in FIG. 8 (step 822). Process 900 may further include document structure analysis (step 924). For example, citation explanation device 120 and/or document device 140 may analyze the cited document structurally. The output of step 924 step is a structural representation of the document, such as a document object model (DOM) tree that captures, for example, sections, paragraphs, sentences, definitions, theorems, and/or algorithms. The structure information of the document and the class information of the claim if available can be used for generating and ranking candidate segments. For example, if the claim is a definition then document structure analysis looks for the definitions of the document. The document structure data may be stored in a storage device, such as database 160, and citation explanation device 120 and/or document device 140 may query database 160 to obtain document structure data. Index data may be obtained prior to the citation claim search step 904 and used in the citation claim search to improve results.

FIGS. 10-12 illustrate schematic diagrams of citation explanations 1000 according to examples. FIG. 10 shows a possible way to display the explanations within the citing document that the user currently reads. When the user selects, for example, clicks or hovers over a citation 1002 in a primary document 1004, a window appears that displays a cited document 1006 and portions of the document representing recommended segments, highlighted 1008 according to their explainability score. The number of highlighted segments in the cited document 1006 is a tunable parameter. It is possible to highlight 1008 only the portion of the document containing the segment with the highest score, as in FIG. 10, or multiple parts containing the top ranked segments as in FIGS. 11-12.

Referring to FIG. 11, multiple portions of the cited document 1006 are highlighted 1008. If more than one segment is needed to explain or define a citation claim. FIG. 11 shows an example, where informative or recommended segments have been found and highlighted 1008 in more than one portion possible spanning multiple pages or cited documents 1006, such as pages in one or more documents, web pages for a website. In addition to highlighting segments, pages may be pinpointed by bookmarks 1110. In an example illustrated in FIG. 11, instead of presenting a multiplicity of recommended segments across document pages, it is possible to show only a composed summary of the segments as explanation prepared during the segment merging and re-ranking (steps 910-912) of FIG. 9.

FIG. 12 shows an example interface when the citation 1002 consists of several pointers as in the example citation "[9, 16, 27]". In FIG. 12, a visual representation of a list 1220 of the cited documents 1006 is provided. The user may browse the options and select one citation 1222 to study, such as document 16. FIG. 12 illustrates an example list 1220 of options containing information about the cited document 1006, such as title, the claims found in the document and their explainability scores, the location of the cited document 1006, such as a local disk, the web, or a cloud. The list 1220 may contain other attributes, such as document properties and results of the analysis for identifying the citation claim. If a document contains multiple segments placed on various pages, the interfaces of FIGS. 11-12 can be combined. Moreover, the interface may be extended to show a document containing more than one highlighted portion 1008 and/or to show a case where the explanation of a single citation claim spans multiple documents, i.e., a list 1220. Alternatively, a composed summary from all documents may be shown to the user.

The disclosed examples may include systems, devices, computer-readable storage media, and methods for providing citation explanations. For purposes of explanation, certain examples are described with reference to the components illustrated in FIGS. 1-3. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are used to distinguish one element from another.

Further, the sequence of operations described in connection with FIGS. 1-12 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this application and protected by the following claims.

We claim:

1. A system for providing citation explanations comprising:
    an extraction engine to extract a citation claim from a primary document using a syntactic analysis of a portion of the primary document;
    a segment generation engine to identify a set of candidate segments of a cited document that may correspond to the citation claim; and
    an evaluation engine to analyze the set of candidate segments to rank each candidate segment of the set of candidate segments based on an explainability score calculated by the system using a combination of a candidate segment position factor, a content similarity value, a structural class factor, and an information value factor, wherein the candidate segment position factor varies based on whether a candidate segment position is in a first or last paragraph of a document or is in a first or last sentence of a paragraph, wherein the system is to display a candidate segment based on the explainability score.

2. The system of claim 1, wherein the extraction engine performs a pre-processing of the citation claim to provide a representation of the citation claim.

3. The system of claim 1, wherein the extraction engine classifies the citation claim based on assignment of predefined classes.

4. The system of claim 1, wherein the evaluation engine merges at least two of the candidate segments to form a revised candidate segment and provides an updated rank to the revised candidate segment.

5. A non-transitory computer-readable storage medium encoded with instructions that, when executed by a processor performs a method, causes the processor to:
    extract and classify a citation claim from a primary document using a syntactic analysis of a portion of the primary document;
    generate a set of candidate segments of a cited document that may correspond to the citation claim;
    analyze the set of candidate segments to rank each candidate segment of the set of candidate segments based on an explainability score calculated by the method using a combination of a candidate segment position factor, a content similarity value, a structural class factor, and an information value factor, wherein the candidate segment position factor varies based on whether a candidate segment position is in a first or last paragraph of a document or is in a first or last sentence of a paragraph; and
    display a candidate segment based on the explainability score.

6. The non-transitory computer-readable storage medium of claim 5, wherein the citation claim comprises at least one structure selected from a vector of words, a topic representation, and a set of exact words.

7. The non-transitory computer-readable storage medium of claim 5, wherein the candidate segment of the set of candidate segments is selected for display based on the explainability score.

8. A method to provide citation explanations comprising:
    analyzing a primary document to extract a citation claim;
    identifying a set of candidate segments of a cited document that may correspond to the citation claim by comparing the cited document and the citation claim to generate at least one candidate segment that matches or explains the citation claim;
    calculating an explainability score;
    evaluating the set of candidate segments to rank each candidate segment of the set of candidate segments based on the explainability score calculated using a combination of a candidate segment position factor, a content similarity value, a structural class factor, and an information value factor, wherein the candidate segment position factor varies based on whether a candidate segment position is in a first or last paragraph of a document or is in a first or last sentence of a paragraph; and
    displaying a candidate segment based on the explainability score.

9. The method of claim 8, further comprising analyzing the primary document using a syntactic analysis that analyzes of the primary document based on at least one of the following methods: sentence boundaries, fixed window context of words around the citation, and predefined number of sentences surrounding a citation.

10. The method of claim 8, further comprising analyzing the cited document to provide a structure for the cited document.

11. The method of claim 8, further comprising analyzing the cited document to generate an index of the cited document.

12. The method of claim 8, further comprising selecting a portion of the cited document to represent at least one candidate segment.

13. The method of claim 8, further comprising merging at least two segments of the set of candidate segments to form a revised candidate segment.

14. The method of claim 13, further comprising providing an explainability score of the revised candidate segment.

* * * * *